United States Patent
Tanaka et al.

(10) Patent No.: US 6,294,280 B1
(45) Date of Patent: Sep. 25, 2001

(54) FUEL CELL STACK

(75) Inventors: Manabu Tanaka, Utsunomiya; Takafumi Okamoto, Koshigaya; Akio Yamamoto; Yosuke Fujii, both of Utsunomiya; Shuji Sato, Kawagoe, all of (JP)

(73) Assignee: Honda Giken Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/390,870

(22) Filed: Sep. 7, 1999

(30) Foreign Application Priority Data

Sep. 10, 1998 (JP) .................................................. 10-257184

(51) Int. Cl.$^7$ ....................................................... H01M 2/00
(52) U.S. Cl. ................................ 429/34; 429/38; 429/26; 429/30
(58) Field of Search ................................ 429/34, 38, 39, 429/35, 30, 26, 120

(56) References Cited

U.S. PATENT DOCUMENTS

| | | | |
|---|---|---|---|
| 5,230,966 | * | 7/1993 | Voss et al. .............................. 429/26 |
| 5,300,370 | * | 4/1994 | Washington et al. ................... 429/34 |
| 5,527,363 | * | 6/1996 | Wilkinson et al. ................... 29/623.1 |
| 5,750,281 | * | 5/1998 | Washington et al. .................... 429/39 |
| 6,066,409 | * | 5/2000 | Ronne et al. ............................ 429/39 |
| 6,071,635 | * | 6/2000 | Carlstrom, Jr. ......................... 429/34 |

FOREIGN PATENT DOCUMENTS 08045520    2/1996    (JP) ................................ H01M/8/02

OTHER PUBLICATIONS

Partial English translation of Japanese Document 08045520 A noted above.

* cited by examiner

*Primary Examiner*—Gabrielle Brouillette
*Assistant Examiner*—R. Alejandro
(74) *Attorney, Agent, or Firm*—Lahive & Cockfield, LLP

(57) ABSTRACT

Disclosed is a fuel cell stack comprising a fuel cell unit and separators which are stacked with each other. The separator is provided with a cooling medium supply port corresponding to a central portion of an electrode power-generating section and a cooling medium discharge port corresponding to an outer circumferential portion of the electrode power-generating section. The cooling medium supply port communicates with the cooling medium discharge port via a cooling medium flow passage having a spiral configuration. Accordingly, the entire fuel cell unit can be uniformly cooled, and the power-generating function can be effectively improved.

7 Claims, 6 Drawing Sheets

FUEL CELL STACK

BACKGROUND OF THE INVENTION

1. Field of the Invention

The present invention relates to a fuel cell stack constructed by alternately stacking separators and fuel cell units each comprising a solid polymer ion exchange membrane interposed by an anode electrode and a cathode electrode.

2. Description of the Related Art

The fuel cell of the solid polymer ion exchange membrane type is constructed as a fuel cell stack comprising a plurality of fuel cell units and a plurality of separators which are alternately stacked, each of the fuel cell units comprising an electrolyte composed of a polymer ion exchange membrane and further comprising a catalyst electrode and a porous carbon electrode which are arranged on both sides of the electrolyte respectively.

Such a fuel cell stack is operated as follows. That is, hydrogen is supplied to an anode electrode, and it is converted into hydrogen ion on the catalyst electrode. The hydrogen ion is moved toward a cathode electrode via the electrolyte which is appropriately humidified or via the electrolyte which is immersed with strong acid. Electron is generated during this process, and it is extracted to an external circuit so that the electron is utilized as DC electric energy. Oxygen-containing gas, for example, oxygen gas or air is supplied to the cathode electrode. Accordingly, the hydrogen ion, the electron, and the oxygen are reacted with each other on the cathode electrode to produce water.

In order to ensure an effective power-generating function of such a fuel cell stack, it is necessary that the electrode power-generating section (power-generating surface) of the fuel cell unit is maintained to be within a predetermined temperature range. For this purpose, it is generally conceived that the heat is absorbed from the electrode power-generating section by using a flow passage provided in the separator for allowing a cooling medium to flow therethrough. Specifically, as shown in FIG. 6, a cooling medium inlet 3 and a cooling medium outlet 4, which are disposed at outer circumferential edge portions, are provided in a flat surface 2 of a separator 1 which is opposed to an anode electrode or a cathode electrode. The cooling medium inlet 3 communicates with the cooling medium outlet 4 via a flow passage 5 formed in the flat surface 2. As shown in FIG. 6, the flow passage 5 is constructed such tat the cooling medium flows in a meandering manner from the lower part to the upper part.

However, in the case of the separator 1 described above, the cooling water flows along the flow passage 5 while absorbing the heat from the power-generating surface. Therefore, the temperature of the cooling water is raised on the downstream side (at upper portions in FIG. 6) of the flow passage 5. For this reason, the following problem is pointed out. That is, a temperature gradient appears over the power-generating surface of the cell in a certain direction as shown in FIG. 6, which causes unevenness of the power-generating performance over the power-generating surface, resulting in deterioration of the performance of the entire fuel cell stack.

In view of the above, for example, as disclosed in Japanese Laid-Open Patent Publication No. 8-45520, a solid polymer type fuel cell is known, in which a cooling water supply port and a cooling water discharge port are arranged at a central portion or a circumferential edge portion of a polymer ion exchange membrane as viewed in a plan view, and the cooling water supply port communicates with the cooling water discharge port via one passage having a spiral configuration.

In the case of the conventional technique described above, when the cooling water supply port and the cooling water discharge port are arranged at the central portion of the polymer ion exchange membrane, then the cooling water flows in a spiral manner from the central portion to the outer circumferential portion of the polymer ion exchange membrane, and then the cooling water is returned from the outer circumferential portion toward the central portion in the spiral manner. On the other hand, when the cooling water supply port and the cooling water discharge port are arranged at the circumferential edge portion of the polymer ion exchange membrane, then the cooling water flows from the circumferential edge portion to the central portion of the polymer ion exchange membrane in the spiral manner, and then the cooling water is returned to the circumferential edge portion.

However, when the fuel cell stack is installed in the atmospheric air at the room temperature, the heat is released to the outside from the outer circumferential portion of each of the fuel cell units. Therefore, the temperature tends to be lowered at the outer circumferential portion as compared with the central portion. For this reason, the following problem is pointed out. That is, when both of the cooling water supply port and the cooling water discharge port are arranged either at the central portion or at the circumferential edge portion of the polymer ion exchange membrane, the temperature distribution is uneven over the entire power-generating surface of the polymer ion exchange membrane.

SUMMARY OF THE INVENTION

A principal object of the present invention is to provide a fuel cell stack which makes it possible to obtain a uniform temperature distribution over a power-generating surface of a fuel cell unit and which makes it possible to simplify the structure in an effective manner.

The above and other objects, features, and advantages of the present invention will become more apparent from the following description when taken in conjunction with the accompanying drawings in which a preferred embodiment of the present invention is shown by way of illustrative example.

DESCRIPTION OF THE PREFERRED EMBODIMENTS

Figure 1:
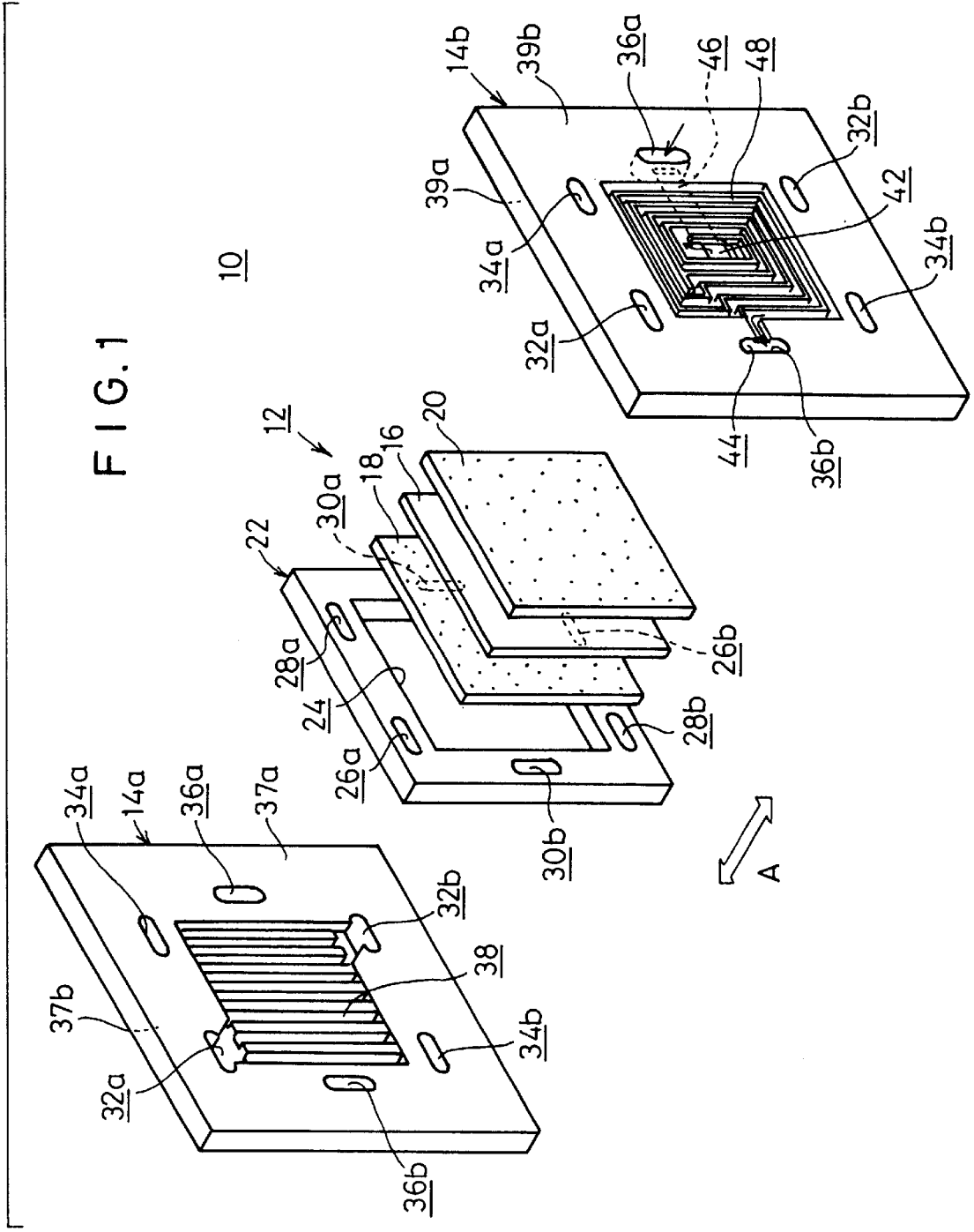
FIG. 1 shows an illustrative perspective view depicting principal parts of a fuel cell stack according to a first embodiment of the present invention.
Figure 2:
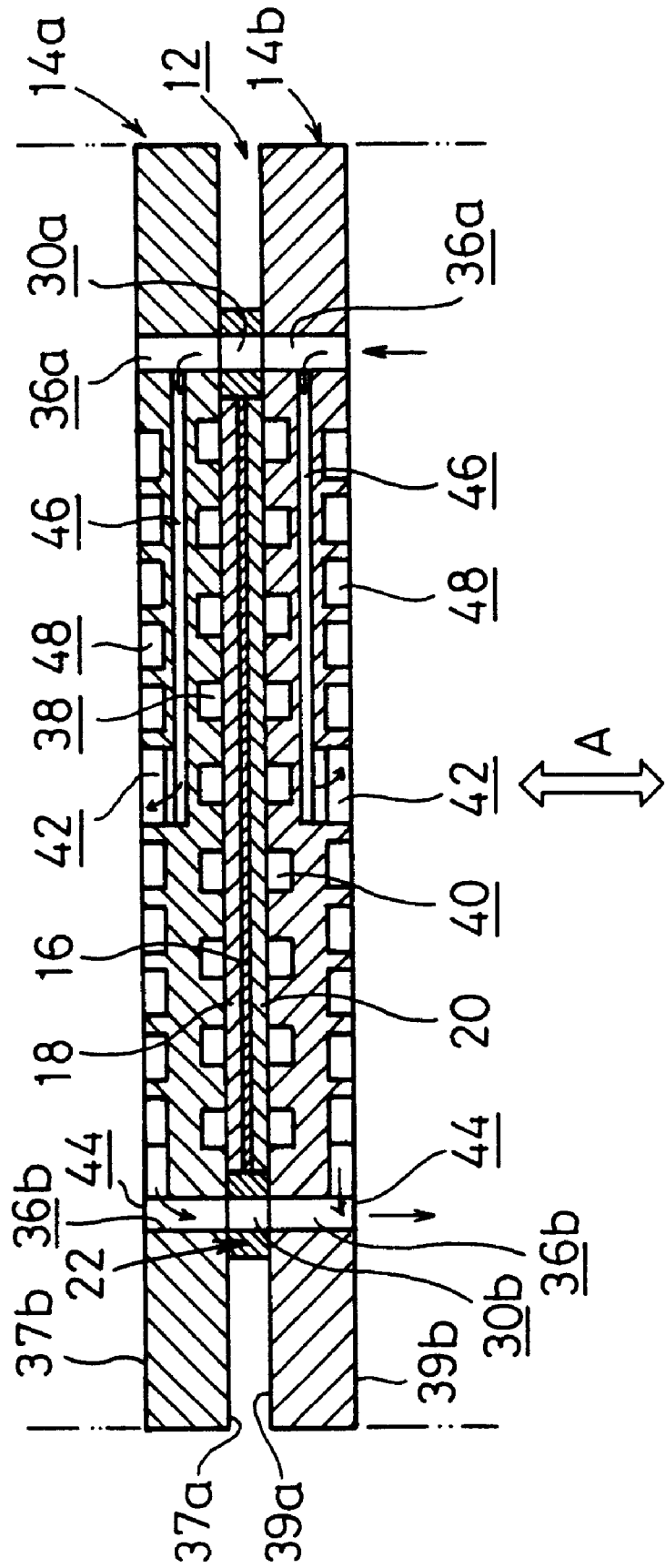
FIG. 2 shows an illustrative sectional view taken along the horizontal direction depicting a part of the fuel cell stack.

FIG. 1 shows an illustrative perspective view depicting principal parts of a fuel cell stack 10 according to a first embodiment of the present invention. FIG. 2 shows an illustrative partial sectional view depicting the fuel cell stack 10.

The fuel cell stack 10 has a multilayered structure comprising a fuel cell unit 12 and separators 14a, 14b which are alternately stacked in the horizontal direction. The fuel cell unit 12 comprises an anode electrode 18 and a cathode electrode 20 with a solid polymer ion exchange membrane 16 interposed therebetween. The operation temperature of the fuel cell unit 12 is, for example, not less than 100° C. A perfluorocarbon sulfonic acid film or a polybenzimidazole film impregnated with strong acid is used for the solid polymer ion exchange membrane 16. The solid polymer ion exchange membrane 16, the anode electrode 18, and the cathode electrode 20 have the same outer diametral size. The fuel cell unit 12, which is constructed by the solid polymer ion exchange membrane 16, the anode electrode 18, and the cathode electrode 20 in an integrated manner, is accommodated in an opening 24 provided through a gasket 22.

A hole 26a for allowing the fuel gas to pass therethrough and a hole 28a for allowing the oxygen-containing gas to pass therethrough are provided on the upper side of the gasket 22. A hole 26b for allowing the fuel gas to pass therethrough and a hole 28b for allowing the oxygen-containing gas to pass therethrough are provided on the lower side of the gasket 22. Holes 30a, 30b for allowing a cooling medium, for example, cooling water to pass therethrough are formed on the both sides of the gasket 22.

Each of the separators 14a, 14b is provided with a fuel gas supply hole 32a and an oxygen-containing gas supply hole 34a which are disposed on the upper side, and it is provided with a fuel gas discharge hole 32b and an oxygen-containing gas discharge hole 34b which are disposed on the lower side. Holes 36a, 36b for allowing the cooling water to pass therethrough are formed on the both sides of the separators 14a, 14b.

A first superficial section 37a of the separator 14a, which is opposed to the anode electrode 18, is formed with a plurality of fuel gas flow passages 38 which extend in the vertical direction to make communication between the fuel gas supply hole 32a and the fuel gas discharge hole 32b. A first superficial section 39a of the separator 14b, which is opposed to the cathode electrode 20, is provided with a plurality of oxygen-containing gas flow passages 40 which extend in the vertical direction to make communication between the oxygen-containing gas supply hole 34a and the oxygen-containing gas discharge hole 34b.

Figure 3:
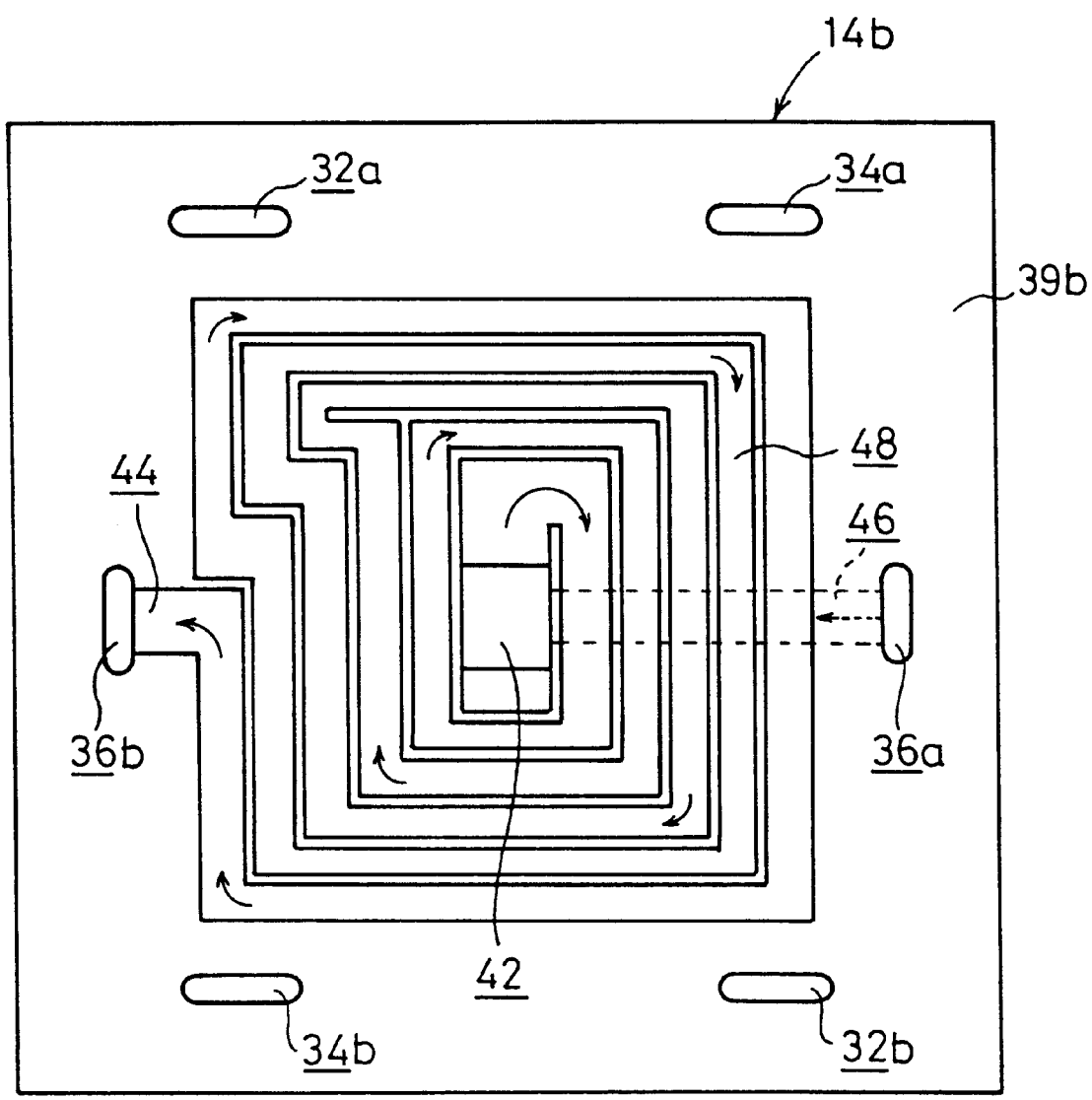
FIG. 3 shows an illustrative front view depicting a separator for constructing the fuel cell stack.

As shown in FIGS. 1 and 3, a second superficial section 39b of the separator 14b is provided with a cooling medium supply port 42 corresponding to a central portion of an electrode power-generating section of each of the anode electrode 18 and the cathode electrode 20. The second superficial section 39b is further provided with a cooling medium discharge port 44 which is formed at one position corresponding to an outer circumferential portion of the electrode power-generating section. The cooling medium supply port 42 is formed by a groove, and it communicates with the hole 36a provided on the side of the separator 14b, via a passage 46 formed through the separator 14b. The cooling medium discharge port 44 communicates with the hole 36b formed on the side of the separator 14b.

A cooling medium flow passage 48 having a spiral configuration, which is used to make communication between the cooling medium supply port 42 and the cooling medium discharge port 44, is formed in the superficial section 39b of the separator 14b. Practically, the cooling medium flow passage 48 is provided by forming a groove having a predetermined depth in the superficial section 39b of the separator 14b. A superficial section 37b of the separator 14a is provided with a cooling medium discharge port 44 and a cooling medium flow passage 48 having a spiral configuration which are disposed in an inverted state concerning the right-hand and the left-hand assuming that the center is the cooling medium supply port 42 provided in the superficial section 39b of the separator 14b.

As shown in FIGS. 1 and 2, the fuel cell stack 10 is designed such that the end surfaces of the separators 14a, 14b protrude outwardly in the surface direction as compared with the end surface of the fuel cell unit 12, with respect to the direction perpendicular to the stacking direction (direction indicated by the arrow A) of the fuel cell unit 12 and the separators 14a, 14b. Each of the separators 14a, 14b is designed to have a size larger in the surface direction than that of the outer diametral size of the gasket 22 for accommodating the fuel cell unit 12. The protruding portions of the separators 14a, 14b, which protrude outwardly in the surface direction from the end surface of the gasket 22, construct cooling fins.

The operation of the fuel cell stack 10 according to the first embodiment constructed as described above will be explained below.

In the fuel cell stack 10, the fuel gas (hydrogen-containing gas) is supplied through the fuel gas supply holes 32a of the separators 14a, 14b, and it is moved in the vertical direction via the fuel gas flow passage 38. During this process, the hydrogen-containing gas is supplied to the anode electrode 18 which is opposed to the fuel gas flow passage 38. On the other hand, the oxygen-containing gas (air or oxygen gas), which is supplied to the fuel cell stack 10, is supplied to the cathode electrode 20 in accordance with the process in which the oxygen-containing gas is supplied through the oxygen-containing gas supply holes 34a of the separators 14a, 14b, and it is moved in the vertical direction via the oxygen-containing gas flow passage 40. Accordingly, the electric power is generated by the fuel cell unit 12.

During this process, the cooling water, which is introduced into the holes 36a of the separators 14a, 14b, passes through the passage 46, and it is fed to the cooling medium supply port 42 provided at the central portion of each of the separators 14a, 14b. The cooling water is supplied from the cooling medium supply port 42 to the cooling medium flow passage 48 provided in the superficial section 37b, 39b of the separator 14a, 14b. The cooling water is moved along the flow direction of the cooling medium flow passage 48, i.e., the cooling water is moved in the spiral manner, and it is discharged to the hole 36b via the cooling medium discharge port 44 disposed at the outer circumferential edge of the separator 14a, 14b.

In the first embodiment, the cooling water is supplied to the cooling medium flow passage 48 via the cooling medium supply port 42 formed at the central portion of the separator 14a, 14b. The cooling water is moved in the spiral manner along the cooling medium flow passage 48, and then it is discharged from the cooling medium discharge port 44 formed at the outer circumferential edge of the separator 14a, 14b. Accordingly, the cooling water at a low temperature is supplied corresponding to the central portion of the electrode power-generating section of each of the anode electrode 18 and the cathode electrode 20. The cooling water cools the electrode power-generating section, and it is moved to the outer circumferential side of the electrode power-generating section in a state in which the temperature of the cooling water itself is raised.

Therefore, the cooling water has the maximum effect to absorb the heat (cooling effect) at the central portion of the electrode power-generating section of each of the anode electrode 18 and the cathode electrode 20. On the other hand, the heat is released to the outside from the outer edge portion of the fuel cell unit 12. Accordingly, the temperature of the outer circumferential portion of the electrode power-generating section tends to be lowered as compared with the temperature of the central portion.

Accordingly, the cooling water has the maximum cooling effect at the central portion of the electrode power-generating section, and thus the temperature distribution over the entire electrode power-generating section is made uniform. An effect is obtained in that the cooling efficiency is effectively improved for each of the fuel cell units 12. Therefore, the power-generating performance of the fuel cell unit 12 is made uniform, and it is possible to effectively maintain the performance of the entire fuel cell stack 10.

In the first embodiment, the outer diametral size of the separator 14a, 14b is designed to be larger in the surface direction than the outer diametral size of the fuel cell unit 12 and than the outer diametral size of the gasket 22 for accommodating the fuel cell unit 12. The outer circumferential portion of the separator 14a, 14b has the function to serve as the cooling fin. Therefore, the heat can be effectively released from the outer circumferential side of each of the fuel cell units 12. Thus, it is possible to easily improve the cooling efficiency.

Figure 4:
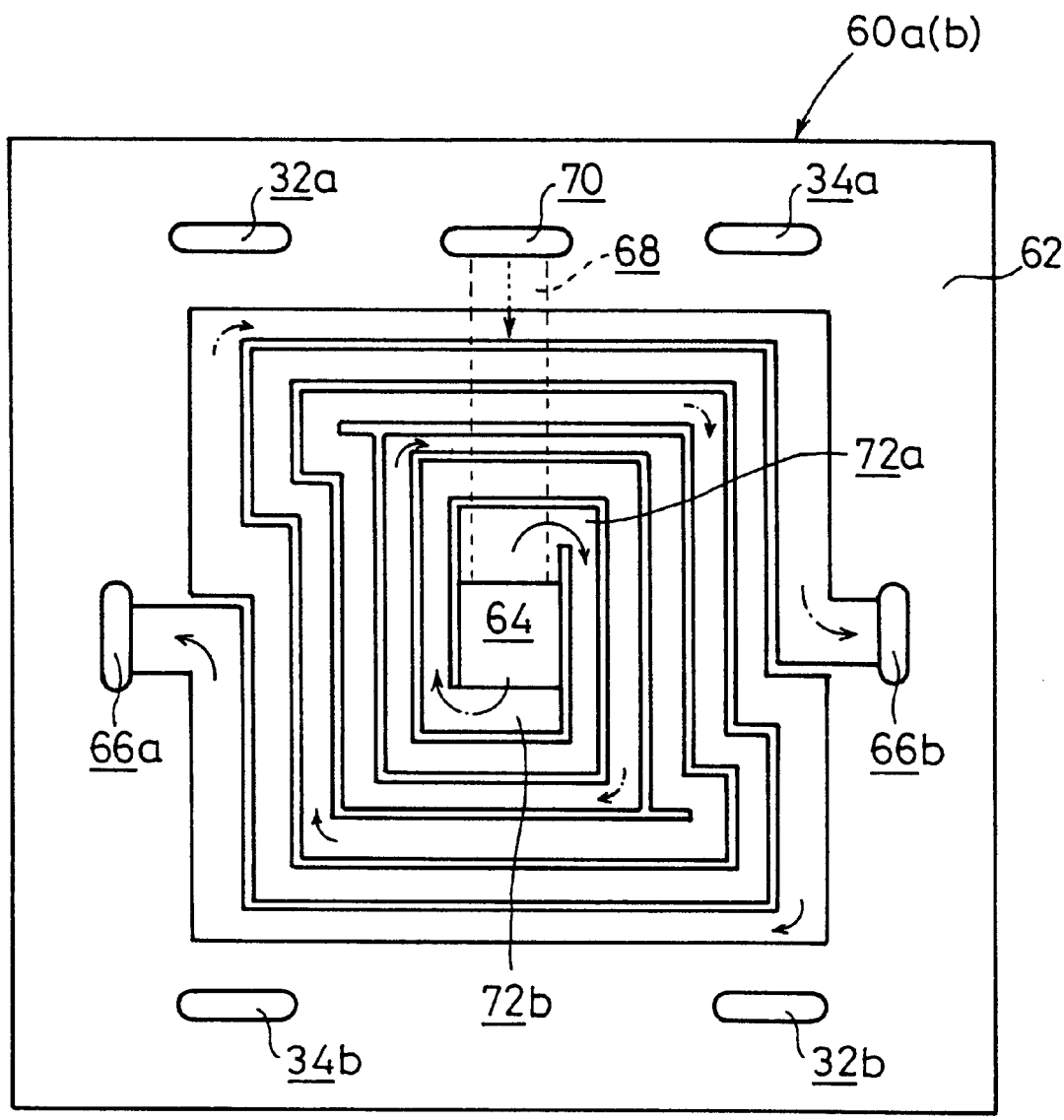
FIG. 4 shows an illustrative front view depicting a separator for constructing a fuel cell stack according to a second embodiment of the present invention.

FIG. 4 shows an illustrative front view depicting a separator 60a, 60b for constructing a fuel cell stack according to a second embodiment of the present invention.

The separators 60a, 60b are used in place of the separators 14a, 14b for constructing the fuel cell stack 10 according to the first embodiment. Each of the separators 60a, 60b is provided with a cooling medium supply port 64 corresponding to the central portion of the electrode power-generating section and a pair of cooling medium discharge ports 66a, 66b corresponding to the outer circumferential portion of the electrode power-generating section, on a superficial section 62 disposed on the side opposite to a superficial section opposed to each of the anode electrode 18 and the cathode electrode 20 shown in FIG. 1.

The cooling medium supply port 64 communicates with a hole 70 via a passage 68 formed in the separator 60a, 60b. First and second cooling medium flow passages 72a, 72b each having a spiral configuration, which make communication between the single cooling medium supply port 64 and the respective cooling medium discharge ports 66a, 66b, are formed in the superficial section 62 of the separator 60a, 60b. A multiple flow passage is formed by the first and second cooling medium flow passages 72a, 72b.

In the second embodiment constructed as described above, the cooling water is supplied from the cooling medium supply port 64 corresponding to the central portion of the electrode power-generating section to the first and second cooling medium flow passages 72a, 72b. The cooling water flows in a spiral manner along the first and second cooling medium flow passages 72a, 72b while cooling the electrode power-generating section. The cooling water is discharged from the cooling medium discharge ports 66a, 66b corresponding to the outer circumferential portion of the electrode power-generating section.

Accordingly, also in the second embodiment, the cooling water having a low temperature is supplied to the central portion of the electrode power-generating section at which the heat release scarcely occurs and at which the temperature is high as compared with the outer circumferential portion, in the same manner as in the first embodiment. Therefore, an effect is obtained in that the cooling efficiency can be effectively improved for the entire electrode power-generating section. Further, in the second embodiment, the first and second cooling medium flow passages 72a, 72b are provided independently. Therefore, the flow passage length of each of them is effectively shortened. Accordingly, the second embodiment is advantageous in that it is possible to mitigate the pressure loss of the cooling water flowing through the first and second cooling medium flow passages 72a, 72b.

Figure 5:
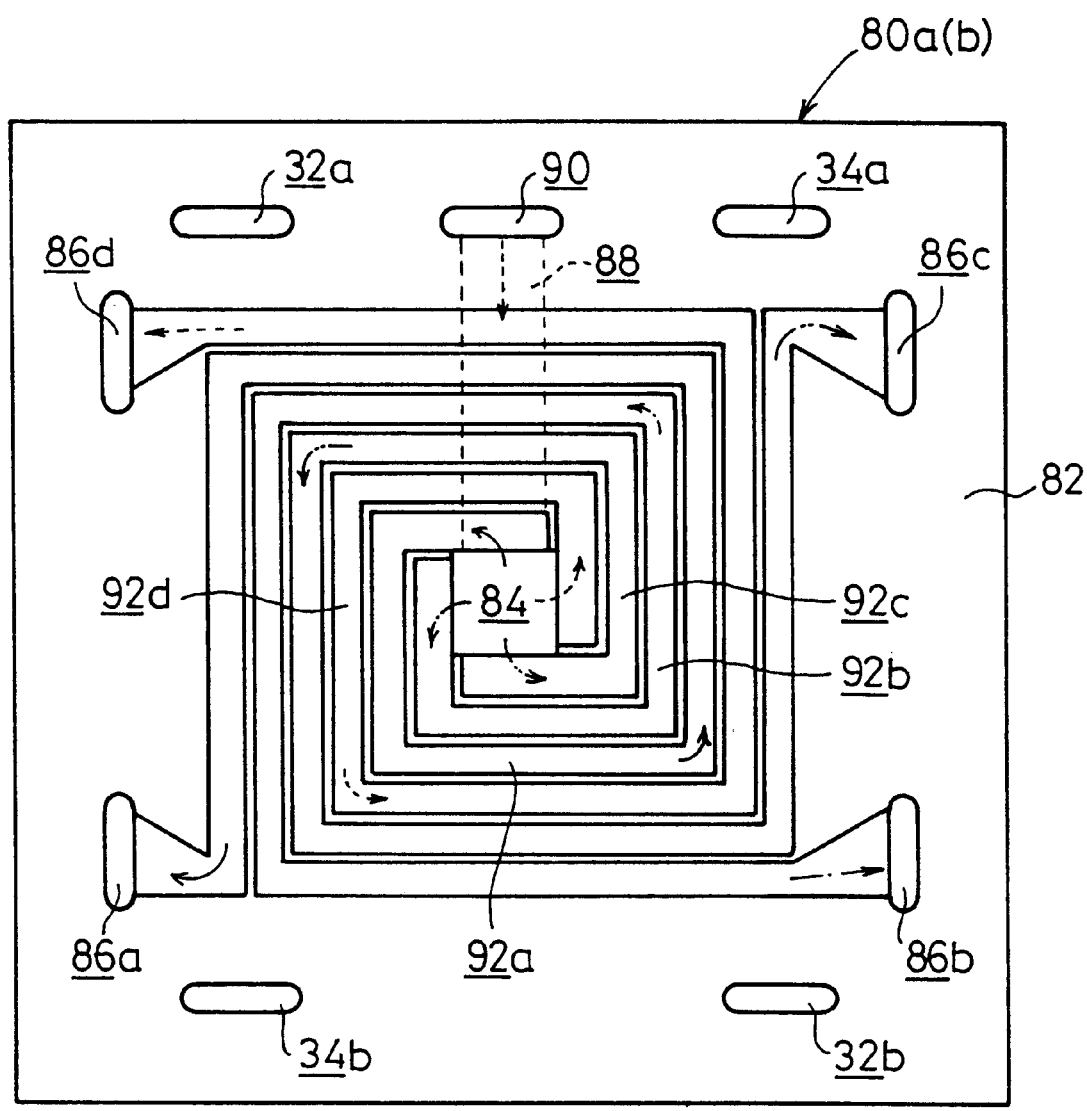
FIG. 5 shows an illustrative front view depicting a separator for constructing a fuel cell stack according to a third embodiment of the present invention.
Figure 6:
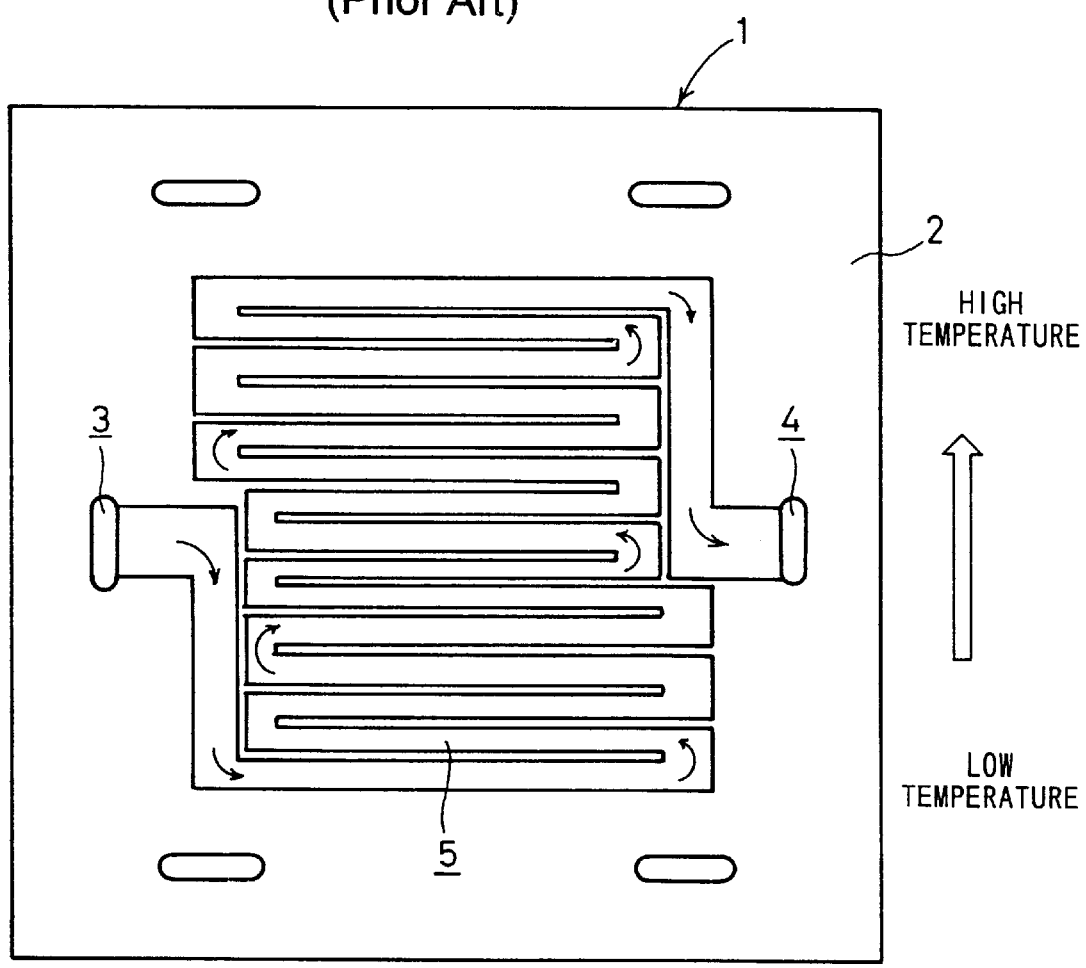
FIG. 6 shows an illustrative front view depicting a separator concerning the conventional technique.

FIG. 5 shows an illustrative front view depicting a separator 80a, 80b for constructing the fuel cell stack according to a third embodiment of the present invention.

Each of the separators 80a, 80b is provided with a cooling medium supply port 84 corresponding to the central portion of the electrode power-generating section and cooling medium discharge ports 86a to 86d corresponding to the outer circumferential portion of the electrode power-generating section, on a superficial section 82 disposed on the side opposite to a superficial section opposed to each of the anode electrode 18 and the cathode electrode 20 shown in FIG. 1. The cooling medium supply port 84 communicates via a passage 88 with a hole 90 formed at an side end edge portion of the separator 80a, 80b. First to fourth cooling medium flow passages 92a to 92d each having a spiral configuration, which make communication between the cooling medium supply port 84 and the four cooling medium discharge ports 86a to 86d, are formed in the superficial section 82 of the separator 80a, 80b. A multiple flow passage is formed by them.

In the third embodiment constructed as described above, the cooling water is supplied from the central portion of the electrode power-generating section to the outer circumferential portion. Therefore, the same effect as that obtained in the first embodiment is obtained, for example, in that the entire electrode power-generating section can be uniformly cooled. Further, the second embodiment is provided with the four of the first to fourth cooling medium flow passages 92a to 92d for making communication between the cooling medium supply port 84 and the four cooling medium discharge ports 86a to 86d. Accordingly, each of the first to fourth cooling medium flow passages 92a to 92d is further shortened as compared with the first and second cooling medium flow passages 72a, 72b according to the second embodiment. Thus, the third embodiment is advantageous in that the pressure loss of the cooling water can be greatly mitigated.

The fuel cell stack according to the present invention is provided with the cooling medium supply port corresponding to the central portion of the electrode power-generating section and the cooling medium discharge port corresponding to the outer circumferential portion of the electrode power-generating section which are formed in the flat surface of the separator. Further, the cooling medium supply port communicates with the cooling medium discharge port via the cooling medium flow passage having the spiral configuration. Accordingly, the cooling medium has the maximum function to absorb the heat at the central portion of the electrode power-generating section. On the other hand, the outer circumferential portion of the electrode power-generating section is easily cooled owing to the heat release. Therefore, it is possible to obtain the uniform temperature distribution over the entire electrode power-generating section. The power-generating performance of the fuel cell unit can be effectively maintained. Thus, it is possible to improve the performance of the entire fuel cell stack.

What is claimed is:

1. A fuel cell stack formed by alternately stacking separators and fuel cell units each comprising a solid polymer ion exchange membrane interposed by an anode electrode and a cathode electrode, said fuel cell stack comprising:

a cooling medium supply port corresponding to a central portion of an electrode power-generating section and a cooling medium discharge port corresponding to an outer circumferential portion of said electrode power-generating section, provided in a flat surface opposed to said anode electrode or said cathode electrode of at least one of said separators; and a cooling medium flow passage having a spiral configuration for making communication between said cooling medium supply port and said cooling medium discharge port, formed in said flat surface, wherein said cooling medium flows in a direction from said central portion to said outer circumferential portion.

2. The fuel cell stack according to claim 1, wherein:

through-holes for allowing a cooling medium to pass therethrough are formed on both sides of said separator; and said cooling medium supply port communicates with said through-hole via a passage formed in said separator, and said cooling medium discharge port communicates with said through-hole.

3. The fuel cell stack according to claim 1, wherein an end surface of said separator is formed to protrude in a direction perpendicular to a stacking direction as compared with an end surface of each of said fuel cell units adjoining on both sides of said separator.

4. The fuel cell stack according to claim 3, wherein said end surface of said separator is formed to protrude in said direction perpendicular to said stacking direction as compared with an end surface of a gasket for accommodating said fuel cell unit.

5. The fuel cell stack according to claim 1, comprising a plurality of cooling medium discharge ports as defined above, wherein said cooling medium flow passages form a multiple flow passage for making communication between said cooling medium supply port and said respective cooling medium discharge ports.

6. The fuel cell stack according to claim 5, wherein an end surface of said separator is formed to protrude in a direction perpendicular to a stacking direction as compared with an end surface of each of said fuel cell units adjoining on both sides of said separator.

7. The fuel cell stack according to claim 6, wherein said end surface of said separator is formed to protrude in said direction perpendicular to said stacking direction as compared with an end surface of a gasket for accommodating said fuel cell unit.

* * * * *

UNITED STATES PATENT AND TRADEMARK OFFICE
CERTIFICATE OF CORRECTION

PATENT NO.   : 6,294,280 B1                                                                    Page 1 of 1
DATED        : September 25, 2001
INVENTOR(S)  : Tanaka et al.

It is certified that error appears in the above-identified patent and that said Letters Patent is hereby corrected as shown below:

<u>Title page,</u>
Item [73], Assignee: please replace the name of the assignee: "Honda Giken Kabushiki Kaisha" with the correct amended name: -- Honda Giken Kogyo Kabushiki Kaisha --

Signed and Sealed this

Thirtieth Day of July, 2002

*Attest:*

JAMES E. ROGAN
*Attesting Officer*   *Director of the United States Patent and Trademark Office*